United States Patent [19]
Vallarino
[11] Patent Number: 4,863,801
[45] Date of Patent: Sep. 5, 1989

[54] SURFACE TREATMENT OF PET FILM

[75] Inventor: Angelo Vallarino, Spotorno, Italy
[73] Assignee: Minnesota Mining and Manufacturing Company, St. Paul, Minn.

[21] Appl. No.: 123,209
[22] Filed: Nov. 20, 1987
[51] Int. Cl.$^4$ ..................... B32B 27/38
[52] U.S. Cl. ..................... 428/414; 428/447; 428/483; 428/913; 430/533; 430/534
[58] Field of Search ............. 430/533, 534, DIG. 454; 428/483, 414, 447, 913

[56] References Cited

U.S. PATENT DOCUMENTS 3,645,740 2/1972 Nishio et al. ..................... 430/535
4,098,953 7/1978 Wright et al. ..................... 428/483
4,124,395 11/1978 Ochia et al. ..................... 428/483
4,156,046 5/1979 Lien et al. ..................... 428/480
4,424,273 1/1984 Franco et al. ..................... 428/483
4,609,617 9/1986 Yamazaki et al. ..................... 430/533

*Primary Examiner*—Edith Buffalow
*Attorney, Agent, or Firm*—Donald M. Sell; Walter N. Kirn; Mark A. Litman

[57] ABSTRACT

Antistatic protection can be provided to a substrate by providing two coatings or layers to the substrate. The first layer is a blend of two different polymers or copolymers that crosslink within the coating and the second layer is a subbing layer. This coated substrate is particularly useful for photographic media.

21 Claims, No Drawings

SURFACE TREATMENT OF PET FILM

FIELD OF INVENTION

The present invention relates to a film coating composition, a coated film substrate, and the process for the application of the coating to a substrate. The coated film is particularly useful as a photographic substrate.

BACKGROUND OF THE ART

Biaxially oriented polyester film, particularly polyethylene terephthalate (PET) is widely used as support for photographic products. The surface of such PET film is hydrophobic and is not very receptive to coatings of hydrophilic layers such as the gelatinous photographic layers. It is often necessary to apply to one or both sides of PET film a primer coating which adheres to the film and is receptive to other overcoatings.

Many different families of polymers have been suggested for preparing a primer layer on a PET film, particularly where the film is to be suitable for photographic use. A pioneering patent, U.S. Pat. No. 2,627,088, describes a primer composition comprising a terpolymer, with polyvinylidene chloride (PCDC) as major component, which gives good adhesion both to PET and to the hydrophilic gelatinous overcoated layer. This discovery generated many applications for the good properties of receptivity provided by the PVDC copolymers. It is well understood in the photographic art that a substrate for a photo-layer application needs performances in areas other than just adhesion: good wetability of the surface is needed to allow good and fast coating of a subbing layer; and good antistatic properties are desirable to avoid problems connected with charge accumulation on the film (dust attraction and electrical spark emission which are recorded by the sensitive film). These other performance characteristics are usually achieved by coating a second suitable layer called a subbing layer. In addition to the above cited quality performances needed in the film, the economic performances must be considered. The most important economic consideration for prior art films is related to the impossibility of recycling the scraps containing PVDC primer generated during the manufacturing of the film. The chloride containing polymer primer is not stable at the high temperature of the PET extrusion. Scrap containing PVDC could not be reextruded because its decomposition would impart an undesirable yellow discoloration to the finished oriented film. A process for washing off the PVDC primer to the PET primed film is done and this results in an additional high cost. Moreover, during the manufacturing of the film the edge trim of this primed film often is sent directly to the extrudor blend: the final result is a continuous increase in the yellowness of the manufactured film.

The good adhesion of PVDC polymer to the PET is essentially due to the intermingling of two polymers at the interface during the heat setting (temperatures higher than the melting points) operation. In fact the PVDC polymer doesn't adhere well to the PET when coated without heat setting. The adhesion of the gelatin layer to the PVDC layer is due to the possibility of covalent bond formation between the electrophilic carbon atoms activated by the couple of contiguous electronegative chlorine and the nucleophilic amino groups of gelatin:

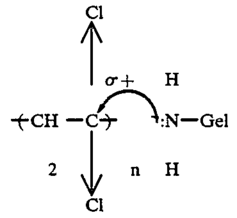

When a polymer different from PVDC is used for the primer, it must contain a gelatin reactive group in the side-chain or (this is the case for example of a unreactive styrene-butadiene primer) it must contain an additional adhesion promoter partner which is reactive with gelatin. The most common are the so-called "gelatin hardners" i.e. bifunctional reactive compounds crosslinking the gelatin macromolecules: melamine-formaldehyde is claimed in U.S. Pat. Nos. 4,123,278, 3,819,771, U.K. Pat. No. 1,540,067; dichlorotriazine salt in U.S. Pat. No. 4,407,939 and dimethylol urea in U.S. Pat. No. 4,424,273.

Within the polymeric primers containing reactive groups different form chlorine (PVDC), the polymers containing epoxy groups reactive with gelatin are diffusely claimed (U.S. Pat. Nos. 3,645,740, 4,098,952, 4,128,426 and 4,328,283, U.K. Pat. Nos. 1,593,343, 2,037,792 and 2,046,626).

Generally speaking, the epoxy groups are not reactive enough and powerful enough to assure good adhesion to the PET surface and to the gelatin layer without an additional physical treatment of the surface.

No PET film has been found on the market for photographic applications having auxiliary priming layers containing epoxy groups. That may mean that this composition is not suitable for making a substrate having the desired properties.

DESCRIPTION OF THE INVENTION

It is possible to obtain a substrate construction that meets quality and cost requirements. In addition, this new substrate is useful for X-ray sensitive film and for graphic arts and for color photographic films.

According to our discovery, the construction of the substrate comprises:

(A) A biaxially stretched PET film to which the primer has been applied prior to the final stretching operation.

(B) A primer composition comprising two polymers: one containing epoxy groups and one containing free hydrogen containing groups such as hydroxy, amine (primary of secondary) and carboxylic groups. The preferred combination of the two polymers is able to provide the coating with a "soft" cross-linked primer. The term "soft" means that the crosslinking degree of the primer composition is developed enough to assure good adhesion without rendering the layer totally insoluble in polyethylene terephthlate (i.e. molten, at 200° C.). This enables the film to be remelted and recycled without gel particle formation. These primer compositions are of particular benefit when combined with:

(C) A subbing composition containing: p1 (1) Colloidal silica plus ambifunctional silane coupling agent as described in 3M 42155 USA 7A or (2) Gelatin and sulfonated polymer (as in 3M U.S. Pat. No. 4,424,273) plus the above mentioned coupling agent.

The process for the production of the coated film assembly comprises the application of the polymeric blended primer between the biaxial stretching of a PET film and then the coating of the subbing formulation.

DETAILED DESCRIPTION OF THE INVENTION

A support layer for use with photosensitive media can be comprised of (a) polyester film, (b) on at least one surface of said polyester film, a primer layer comprising a blend of at least two polymers (preferably copolymers), one of said polymers or copolymers containing a reactive epoxy group and the other of said polymers or copolymers containing an hydroxy or a carboxylic acid group or salified carboxylic group (e.g., COO-M, wherein M is H, alkali metal, or NHy+. Preferably, said primer layer is coated with a subbing layer comprising a carrying medium and an ambifunctional silane coupling agent.

The support layer is prepared by the steps of (a) first stretching a substantially amorphous polyester film in one direction, (b) coating said amorphous film after said first stretching with a primer composition comprising a mixture or blend of at least two copolymers, one of said copolymers containing a reactive epoxy group and the other of said copolymers containing a carboxylic acid group and drying said primer composition. Said process preferably includes the further step of (c) performing a second stretching on said coated film in a direction approximately perpendicular to the direction of the first stretching, and (d) applying a subbing layer composition to said coated film over said primer layer after said second stretching, said subbing layer comprising a carrying medium and an ambifunctional silane coupling agent.

The polymer- and copolymer components of the primer layer may be common and commercially available polymeric materials. It has been found to be more convenient to use copolymer materials to control the proportion of reactive moieties on the polymer (copolymer, terpolymer, etc.) chain. By controlling the molar or weight percentage of monomeric units in the polymer which have pendant reactive moieties (i.e., free hydrogen containing or epoxy), the degree of crosslinking in the polymer can be readily controlled.

Highly crosslinked polymers according to the present invention have been found to be novel and excellent primers for photographic subbing compositions. Even though these primers are not soluble in molten polyester (e.g., polyethyleneterephthalate at a temperature of at least 200° C., often 240°-260° C.), they are effective primers that cannot be recycled as scrap additives into virgin polyester for imaging substrates. The more moderately crosslinked polymers according to the present invention do not necessarily act as better primers for the subbing compositions, but do enable the scrap to be recycled into virgin or photobase grade polyester and allow that mixture to be used as photobase grade polyester without chemical washing. In order for the polymer to provide this additional capability to the primed polyester, the crosslinked polymer must be swellable in an organic solvent (e.g., acetone, ketones, tetrahydrofuran, chlorinated hydrocarbons, hydrocarbons, etc.) and must be soluble in pure molten polyethyleneterephthalate (approximately 200° C.). This solubility is essential for the recyclability of the primed polyester without chemical washing.

When PVDC primed polyester is directly recycled, the initial melt is very dark because of the instability or decomposition of the materials, and the extruded film is optically unclear (e.g., hazy), PVDC tends to yellow polyester because of the chlorine present in the PVDC. All of these problems during recycling can be presented by the appropriate selection of the crosslinked primer of the present invention.

The two polymers are generally combined in amounts of 20–80% (by weight) of one polymer (with free hydrogen containing moieties on the polymer) and 80–20% by weight of the second polymer (with reactive epoxy groups pendant from the polymer). The polymer with the pendant free hydrogen containing groups is generally constructed so that 0.5 to 20%, preferably 1 to 15%, more preferably 1 to 10%, and most preferably 2 to 8% by weight of all units derived from monomers in that polymer contain free hydrogen containing groups. Where a single monomer is used to form a homopolymer (and therefore 100% of the units derived from monomers contain free hydrogens), that homopolymer must be subsequently reacted (or a portion of the monomer prereacted) to control the percentage of free hydrogen groups. The hydroxyl or carboxylic acid containing moieties may be controllably esterified, for example, and the amines may be controllably converted to tertiary amines to give the polymers the desired level of reactivity. This additional step with the homopolymers is the reason, as described before, why copolymers are preferred. One can merely select, for example, six weight percent of monomers with hydroxyl or carboxylic acid groups (non-reactive in the polymerization mechanism for forming the polymer) and ninety-four percent of monomers without hydroxyl groups). The corresponding polymer containing reactive epoxy groups should have 5 to 50%, preferably 10 to 40%, and more preferably 15 to 35% by weight of all units derived from monomers in that polymer containing epoxy groups.

The molecular weights of the polymers need be selected only upon a basis that the final polymer primer has film forming properties. This would generally require that the individual polymers or copolymers have molecular weights of at least 50,000, preferably at least 80,000, and more preferably at least 100,000. The final composition is preferred to have a first order glass transition temperature of from 10° C. to 70° C.

It is, of course, contemplated in the practice of the present invention to have the polyester substrate subjected to physical treatment to enhance coatability or bondability. Such treatments as corona discharge, sputter-etching, flame treatment, radiation ablations, or other surface modifications can be useful.

The terma ambifunctional silane means that the compound has reactive silanes on one end of the molecule and a different reactive species capable of reacting with a photographic hardener for gelatin or directly with gelatin. This second functionality enables the compound to react with the inorganic particle (through the silane group) and also react with the gelatin (reacting with the gelatin hardener which also reacts with the gelatin). Amongst the preferred second functional groups on the compound are amino groups and epoxy (e.g., glycidyl) groups. The second functionality may be present as a single functional moiety or may be present as a multiple number of such groups.

A formula that may be used to represent many of the ambifunctional silanes of the present invention is $(Q)_n-R-Si(OR^1)_3$ wherein $R^1$ is alkyl or aryl, R is an organic group with (n+1) external bonds or valences, n is 0, 1 or 2, and Q is a moiety reactive with photographic hardeners or directly with gelatin (e.g., alpha-amino acids).

Preferably $R^1$ is alkyl of 1 to 10 carbon atoms and most preferably 1 to 4 carbon atoms. R is preferably an aliphatic or aromatic bridging group such as alkylene, arylene, alkarylene, or aralkylene which may be interrupted with ether linkages (oxygen or thioethers), nitrogen linkages, or other relatively inert moieties. More preferably R is alkylene of 1 to 12 carbon atoms, preferably 2 to 8 carbon atoms, with n equal to 1. Q is preferably epoxy, or amino, primary or secondary, more preferably primary amino.

Where previously indicated that the second functional group may be present as a multiple number of such groups it is meant that the moiety $(Q)_n-R-$ may include moieties such as $NH_2-(CH_2)_2-NH-(CH_2)_2-NH-(CH_2)_3-$ $NH_2-(CH_2)-_3$ $(NH_2)_2-CH-CH_2-$ $(NH_2)-CH_2$
CH—
$(NH_2)-CH_2$ and the like.

The substrate of the invention wherein the carrying medium comprises inorganic particle bears a coating comprising a continuous gelled network of inorganic metal oxide particles, the network containing an ambifunctional silane. The particles preferably have an average primary particle size of less than about 500 or 200 Å. As used herein, the term "continuous" refers to covering the surface of the substrate with virtually no straight-line penetrable discontinuities or gaps in the areas where the gelled network is applied. However, the layer may be and usually is porous, without significant straight-line pores or gaps in the layer. The term "gelled network" refers to an aggregation of colloidal particles linked together to form a porous three-dimensional network. Generally all of or the majority of linkages are from the material of the particles to each other and to the silane, but some binder such as up to about 5% by weight of the metal oxide of gelatin may also be present. The term "porous" refers to the presence of voids between the inorganic metal oxide particles created by the packing of the metal oxide particles. The term "primary particle size" refers to the average size of unagglomerated single particles of inorganic metal oxide. The term "particle" includes spherical, non-spherical, and fibrillar particulate arrangements. If the ambifunctional silane is added to an aqueous metal oxide sol before coating, then the silane will be hydrolyzed at the positions, described as (OR′) at page 4, line 6, substituting hydroxy groups for the (OR′) groups. For example, a triethoxysilane will become a trihydroxysilane. In solution with the metal oxide particles, the hydrolyzed silane molecules may associate with the metal oxide particles by "oxane" bonding in a reversible fashion (SiOH+HOM(particle)⟷Si—O—M— (particle)). As the solution is dried into a coated layer, it is expected that most of the hydrolyzed silane molecules will become associated with metal oxide particles through "oxine" bonding such that they cannot be washed out of the coating by a simple water wash. The presence of the silane molecules does not prevent the gelled particle network from gaining cohesive strength, although the time required to gain cohesive strength may be increased.

The coating should be thicker than a monolayer or particles. Preferably the coating comprises a thickness equal to or greater than three average particle diameters and more preferably equal to or greater than five particle diameters.

The articles of the invention comprise a substrate which may be transparent, translucent, or opaque to visible light having at least one polymeric surface, and have formed thereon a coating in the form of a continuous gelled network of inorganic oxide particles with an adhesion promoting effective amount of an ambifunctional silane. When the coating is applied to transparent substrates to achieve increased light transmissivity, the coated article preferably exhibits a total average increase in transmissivity of normal incident light of at least two percent and up to as much as ten percent or more, when compared to an uncoated substrate, depending on the substrate coated, over a range of wavelengths extending at least between 400 to 900 nm. An increase in light transmission of two percent or more is generally visually apparent and is sufficient to produce a measurable increase in energy transmissivity when the coated substrate is used. An increase in transmissivity is also present at wavelengths into the infrared portion of the spectrum.

The gelled network is a porous coating having voids between the inorganic oxide particles. If the porosity is too small, the antirereflectance may be reduced. If the porosity is too large, the coating is weakened and may have reduced adhesion to the substrate. Generally, the colloidal solution from which the gelled network is obtained is capable of providing porosity of about 25 to 70 volume percent, preferably about 30 to 60 volume percent when dried. The porosity can be determined by drying a sufficient amount of the colloidal solution to provide a dried product sample of about 50 to 100 mg and analyzing the sample using a "Quantasorb" surface area analyzer available from Quantachrome Corp., Syosett, NY.

The voids of the porous coating provide a multiplicity of subwavelength interstices between the inorganic particles where the index of refraction abruptly changes from that of air to that of the coating material. These subwavelength interstices, which are present throughout the coating layer, provide a coating which may have a calculated index of refraction (RI) of from about 1.15 to 1.40, preferably 1.20 to 1.30 depending on the porosity of the coating. When the porosity of the coating is high, e.g., about 70 volume percent or more, lower values for the RI are obtained. When the porosity of the coating is low, e.g., 25 volume percent or less, higher values for the RI are obtained.

The average primary particle size of the colloidal inorganic metal oxide particles is preferably less than about 200 Å. The average primary particle size of the colloidal inorganic metal oxide particles is more preferably less than about 70 Å. When the average particle size becomes too large, the resulting dried coating surface is less efficient as an antireflection coating.

The average thickness of the dried coating is preferably from about 300 to 10,000 Å, more preferably 800 to 5000 Å and most preferably between 900 and 2000 Å. Such coatings provide good antistatic properties. When the coating thickness is too great, the coating has reduced adhesion and flexibility and may readily flake off or form powder under mechanical stress.

Articles such as transparent sheet or film materials may be coated on a single side or on both sides to increase light transmissivity, the greatest increase being achieved by coating both sides.

The process of coating the particulate subbing layer of the present invention comprises coating a substrate with a solution of colloidal inorganic metal oxide particles (and preferably the silane at this point), the solution preferably containing at least 0.2 or 0.5 to 15 weight percent of the particles, the particles preferably having an average primary particle size less than about 500 or 200 Å, more preferably less than about 70 Å, and drying the coating at a temperature less than that which degrades the substrate, preferably less than about 200° C., more preferably in the range of 80° to 120° C. The coating provides the substrate with an average reduction in specular reflectance of at least two percent over wavelengths of 400 to 900 nm.

Coating may be carried out by standard coating techniques such as bar coating, roll coating, knife coating curtain coating, rotogravure coating, spraying and dipping. The substrate may be treated prior to coating to obtain a uniform coating using techniques such as corona discharge, flame treatment, and electron beam. Generally, no pretreatment is required. The ambifunctional silane may be added before, during or after coating. It is preferred to add the silane to the coating mixture before coating. If the silane is added after the "gelled network" has been coated and dried, it should be added from a water-containing solution, so that the silane will be in its hydrolyzed form.

The colloidal inorganic oxide solution, e.g., a hydrosol or organosol, is applied to the substrate of the article to be coated and dried at a moderately low temperature, generally less than about 200° C., preferably 80°-120° C., to remove the water or organic liquid medium. The coating may also be dried at room temperature, provided the drying time is sufficient to permit the coating to dry completely. The drying temperature should be less than at which the substrate degrades. The resulting coating is hygroscopic in that it is capable of absorbing and/or rehydrating water, for example, in an amount of up to about 15 to 20 weight percent, depending on ambient temperature and humidity conditions.

The colloidal inorganic oxide solution utilized in the present invention comprises finely divided solid inorganic metal oxide particles in a liquid. The term "solution" as used herein includes dispersions or suspensions of finely divided particles of ultramicroscopic size in a liquid medium. The solutions used in the practice of this invention are clear to milky in appearance. Inorganic metal oxides particularly suitable for use in the present invention are those in which the metal oxide particles are negatively charged, which includes tin oxide ($SnO_2$), titania, antimony oxide ($Sb_2O_5$), silica, and alumina-coated silica as well as other inorganic metal oxides of Groups III and IV of the Periodic Table and mixtures thereof. The selection of the inorganic metal oxide is dependent upon the ultimate balance of properties desired. Inorganics such as silicon nitride, silicon carbide, and magnesium fluoride when provided in sol form are also useful.

The colloidal coating solution preferably contains about 0.2 to 15 weight percent, more preferably about 0.5 to 8 weight percent, colloidal inorganic metal oxide particles. At particle concentrations about 15 weight percent, the resulting coating may have reduced uniformity in thickness and exhibit reduced adhesion to the substrate surface. Difficulties in obtaining a sufficiently thin coating to achieve increased light transmissivity and reduced reflection may also be encountered at concentrations above about 15 weight percent. At concentrations below 0.2 weight percent, process inefficiences result due to the large amount of liquid which must be removed and antireflection properties may be reduced.

The thickness of the applied wet coating solution is dependent on the concentration of inorganic metal oxide particles in the coating solution and the desired thickness of the dried coating. The thickness of the wet coating solution is preferably such that the resulting dried coating thickness is from about 80 to 500 nm thick, more preferably about 90 to 200 nm thick.

The coating solution may also optionally contain a surfactant to improve wetability of the solution on the substrate, but inclusion of an excessive amount of surfactant may reduce the adhesion of the coating to the substrate. Examples of suitable surfactants include "Tergitol" TMN-6 (Union Carbide Corp.) and "Triton" X-100 (Rohm and Hass Co.). Generally the surfactant can be used in amounts of up to about 0.5 weight percent of the solution.

The coating solution may optionally contain a very small amount of polymeric binder, particularly a hydrophilic polymer binder, to improve scratch resistance, or to reduce formation of particulate dust during subsequent use of the coated substrate. Useful polymeric binders include polyvinyl alcohol, polyvinyl acetate, gelatin, polyesters, polyamides, polyvinyl pyrrolidone, copolyesters, copolymers of acrylic acid and/or methacrylic acid, and copolymers of styrene. The coating solution can contain up to about 5 weight percent of the polymeric binder based on the weight of the inorganic metal oxide particles. Useful amounts of polymeric binder are generally in the range of about 0.1 to 5 weight percent to reduce particulate dust. These binders can reduce some of the beneficial properties (e.g., antistatic properties) of the coatings if used in larger amounts, so that they are not most preferred.

The ambifunctional silane is generally present as at least 0.1% by weight of the solids content of the gelled particulate layer. Preferably the ambifunctional silane is present as from 1 to 20% by weight of the solids content of the particulate layer. More preferably the silane is present as 0.2 to 10% by weight of the solids content of the particulate layer.

PRIOR ART

U.S. Pat. No. 3,645,740 describes compositions containing gelatin and glycidylmethacrylate copolymer. Example describes PET and CTA surface physically treated before the subbing coating (U.V. radiation).

U.S. Pat. No. 3,819,773 claims a process for the production of PET film coated with an acrylic thermosetting composition (acrylic polymer and amino formaldehyde condensate). This product can be reclaimed with fresh PET resin. Examples describe the use of base for solvent coating compositions.

U.K. Pat. No. 1,583,343 claims a process for the production of photobase. The primer composition is very broadly described as acrylic-styrene polymers (GMA-AN-HEMA) with and without crosslinking agents. The primer layer is subjected to corona treatment before photo coating.

U.S. Pat. No. 4,098,952 describes a coated film assembly comprising PET and primer composition [glycidyl-methacrylate-x-acrylonitrile] where x is an acrylic group. The presence of acrylonitrile in the polymer is considered unique to avoid solvent penetration and give compatibility and adhesion with the overcoating.

U.S. Pat. No. 4,128,426 shows a process for a photobase:

(1) PET surface corona treatment. In all examples they use cellulose triacetate or biaxially stretched PET.

(2) Coating with acrylate composition having glycidylmethacrylate in greater than 15% concentration and no acrylic acid.

(3) Coating with silica without gelatin, and without coupling agents.

U.K. Pat. No. 2,037,792 claims a primer composition containing butyl acrylate, glycidylmethylacrylate and styrene [BA-GMA-ST] with the composition comprising percentages of GMA greater than 35 and ST greater than 10.

U.K. Pat. No. 2,046,626 claims a primer composition for photobase PET containing glycidylmethylacrylate, butadiene [GM-BUT-X] with the percentage of GMA greater than 60.

U.S. Pat. No. 4,328,283 describes a primer composition of glycidyl of a copolymer [GMA-HEMA] where GMA concentration is greater than 30%, HEMA is greater than 3%, for the example the PET is biaxially stretched and corona treated.

U.S. Pat. No. 4,329,423 describes compositions of photo base comprising PET with a subbing composition of ethylacrylate, methylmethacrylate, and itaconic acid [EA-MMA-IA] and the concentration of IA is greater than 1%.

U.S. Pat. No. 4,609,617 describes a primer composition containing [GMA-EA-ST] with the epoxy ring opening content between 5-35 mole % having no acrylic acid. In example the process is PET biaxially stretched-corona treated-primer coating.

PREPARATION OF POLYMER LATEXES

Example 1: Preparation of latex of [ethyl acrylate-methyl methacrylate]

8 g. of Na alkylarylpolyoxyethylene sulfonate (trade name Triton X-200) was dissolved in 1000 ml. of water at 40° C. in a flask with stirrer and condenser. A mixture of 250 g. of ethyl acrylate and 250 g. of methyl methacrylate were separately prepared. A portion of 125 g. of above monomer mixture and 0.5 g. of ammonium persulfate were added to the flask. The temperature was gradually elevated to 85° C. while stirring. At 83° C. the polymerization reaction started and the system was maintained in the condition of moderate reflux for 5 minutes. Then the remaining part of the monomer mixture was added dropwise through a dropping funnel. At the end of addition the reaction was carried out at 90° C. for an additional hour and this permitted the polymerization reaction to proceed to near completion. The temperature was then lowered to 70° C. and the flask put under light vacuum: In this condition under slow stirring and adding water in order to maintain the original level, the unreacted monomer was stripped out to a safe concentration of <3 p.p.m. The final latex is odorless. A sample of latex was dried obtaining a dry polymer content of 33.7%.

Example 2: Preparation of latex [ethylacrylate-methyl methacrylate-methacrylic acid]

The procedure of Example 1 was repeated, a mixture of monomers containing 250 g of ethylacrylate, 225 g of methylmethacrylate, 25 g of methacrylate acid was employed.

Example 3: Preparation of latex [ethylacrylate-methyl methacrylate-glycidylmethacrylate]

The procedure of Example 1 was repeated, a mixture of monomers containing 250 g of ethylacrylate, 150 g of methylmethacrylate, 100 g of glycidylmethacrylate was employed.

Example 4: Preparation of latex [ethylacrylate-methyl methacrylate-glycidylmethacrylic acid]

The procedure of Example 1 was repeated, a mixture of monomers containing 250 g of ethylacrylate, 185 g of methylmethacrylate, 100 g of glycidylmethacrylate, 25 g of methacrylic acid was employed.

Example 5: Preparation of latex [ethylacrylate-methyl methacrylate-ethyleneglycoldimethylacrylate]

The procedure of Example 1 was repeated, a mixture of monomer containing 250 g of ethylacrylate, 245 g of methylmethacrylate, 5 g of ethyleneglycoldimethacryalte was employed.

COATING EXPERIMENTS OF PRIOR ART

Examples 6-17

A polyethylene terephthalate resin was melt extruded and quenched on a cooled rotating drum. The resulting substantially amorphous film was stretched in the longitudinal direction about 3.3 times its original length. It was then coated by air knife coating technique with five different compositions (primers 1-5) containing respectively the prepared latexes of Examples 1-5.

The primer composition was:

Latex 10% solid 96.4 ml

Ultravon w* 5% water 3.6 ml (* Ultravon w is a dispersing agent wold by CIBA-GEIGY A.G., Switzerland)

The dried coated film was then transversally stretched in a tenter frame to 3.5 times its original width and heat-set at a temperature near 220° C.

All the film was totally clear except the primed number 4 containing the latex of Example 4 which became hazy after the stretching. We relate this behavior with the high internal preformed crosslinking of the copolymer due to the presence of both epoxy and carboxylic reactive groups on the same polymeric chain.

The four clear primed PET films were then coated with different subbing compositions employing the following substrate formulations available for photographic layer application.

TABLE I

| | | Substrates | |
|---|---|---|---|
| | | Subbing Composition | |
| Ex. No. | Primer Latex | $SiO_2$ | Adhesion Promoter |
| 6 | 1 | Ludox AM* | / |
| 7 | 1 | " | GPS** |

TABLE I-continued

| | | Substrates | |
|---|---|---|---|
| | | Subbing Composition | |
| Ex. No. | Primer Latex | $SiO_2$ | Adhesion Promoter |
| 8 | 1 | " | APS*** |
| 9 | 2 | " | / |
| 10 | 2 | " | GPS |
| 11 | 2 | " | APS |
| 12 | 3 | " | / |
| 13 | 3 | " | GPS |
| 14 | 3 | " | APS |
| 15 | 4 | " | / |
| 16 | 4 | " | GPS |
| 17 | 4 | " | APS |

*Ludox AM is a commercial colloidal silica dispersion sold by DuPont
**GPS means glycidoxypropyltrymethoxysilane
***APS means aminopropyltriethyoxysilane The subbing compositions contained 2.75% of solid. The adhesion promoter/$SiO_2$ ratio was 10/100 parts by weight.

The surfactant triton X-100, sold by Rohm & Haas was added in 0.07 percent by weight of the final subbing composition.

PHOTOLAYER COATING

The above described substrates were coated with both an X-ray sensitive emulsion (Q1) and a graphic arts emulsion (Q2). The coated layer was incubated 4 hours at 50° C. A wet and dry standard adhesion test was then performed after development (wet) and after complete processing (dry). In Table II the results are reported.

TABLE II

| | ADHESION TEST | | | |
|---|---|---|---|---|
| | Q1 | | Q2 | |
| Substrate | Wet | Dry | Wet | Dry |
| 6 | 0 | 0 | 0 | 0 |
| 7 | 6 | 2 | 2 | 4 |
| 8 | 0 | 0 | 2 | 4 |
| 9 | 0 | 0 | 0 | 0 |
| 10 | 8 | 8 | 6 | 4 |
| 11 | 6 | 8 | 8 | 4 |
| 12 | 0 | 0 | 0 | 0 |
| 13 | 8 | 10 | 8 | 4 |
| 14 | 10 | 8 | 8 | 4 |
| 15 | 0 | 0 | 0 | 2 |
| 16 | 2 | 4 | 0 | 2 |
| 17 | 2 | 4 | 0 | 4 |

0 = very bad
10 - very good

From these results it can be seen that the subbing compositions ccontaining $SiO_2$ without adhesion promoter are very poor in adhesion; a considerable improvement of the adhesion value was obtained by the introduction of silane coupling agents but the result didn't reach the total level of a good performance of adhesion required for photographic products.

With the substitution of $SiO_2$ with gelatin in examples 6–17 the adhesion values became worse. The above primer formulations can represent the primers described in the prior art. The subbing layer with $SiO_2$ and coupling agents are described in a very recent 3M patent application.

COATING EXPERIMENTS OF PRESENT INVENTION

A mixture 1:1 by weight by latex 2 containing a polymer with carboxylic groups and of latex 3 containing a polymer with epoxy groups was coated on a PET film in the same condition as for the primer of Examples 1–5.

Different subbing formulations were then coated on this primed PET film with the same modality of Example 6–17, obtaining the following substrates.

TABLE III

| SUBSTRATES | | | |
|---|---|---|---|
| | | Subbing | |
| Example | Primer Latex | $SiO_2$ | Adhesion Promoter |
| 18 | 2 + 3 | Ludox AM | / |
| 19 | " | " | GPS |
| 20 | " | " | APS |
| 21 | " | Nalco 2326 | / |
| 22 | " | " | GPS |
| 23 | " | " | APS |

X-ray sensitive Q1 and the graphic arts Q2 emulsions were subsequently coated on the prepared substrates of Table III and the adhesion tests performed.

TABLE IV

| | ADHESION TEST | | | |
|---|---|---|---|---|
| | Q1 | | Q2 | |
| Substrate | Wet | Dry | Wet | Dry |
| 18 | 0 | 4 | 0 | 2 |
| 19 | 10 | 10 | 10 | 10 |
| 20 | 10 | 10 | 10 | 10 |
| 21 | 0 | 2 | 2 | 4 |
| 22 | 10 | 10 | 10 | 10 |
| 23 | 10 | 10 | 10 | 10 |

In this case the adhesion of the photographic films was excellent under all conditions.

The Examples 18–23 were repeated and $SiO_2$ was substituted with gelatin in the subbing compositions. All the adhesion value results were very poor.

EXAMPLES 24–29

The antistatic subbing formulation described in Example 5, page 9 of U.S. Pat. No. 4,424,273 was prepared.

| | |
|---|---|
| Na polyvinylbenzal 2,4 disulfonate | 6 g |
| Gelatin | 3 g |
| Polyethylacrylate latex 10% solid | 1.6 g |
| Polymethylmethacrylate bead dispersion (3% solid) | 5 g |
| $H_2O$ to | 1000 g |

The composition was divided into 6 parts and different adhesion promoters were added obtaining the following subbing compositions which were coated on latex (combination of Examples 2 and 3) primed PET.

TABLE V

| SUBSTRATES | | |
|---|---|---|
| | Subbing Composition | |
| Substrate | Adhesion Promoter | Total Solid (%) |
| 24 | Dimethylol Urea (U.S. Pat. No. 4,626,273) | 5 |
| 25 | Cymel 373* | 10 |
| 26 | Cymel 385** | 10 |
| 27 | APS | 10 |
| 28 | GPS | 10 |
| 29 | APS + GPS | 10 + 10 |

*Cymel 373 is a commercial melamine-formaldehyde condensate polymer sold by Cyanamid
**Cymel 385 is a commercial melamine-formaldehyde condensate monomer sold by Cyanamid.

The prepared substrates were then coated both with X-ray sensitive emulsion (Q1) and graphic arts emulsion (Q2). After 5 hours of incubation at 50° C. the films were checked for adhesion. The results obtained are reported in Table VI.

TABLE VI

| ADHESION TEST | | | | |
|---|---|---|---|---|
| | Q1 | | Q2 | |
| Substrate | Wet | Dry | Wet | Dry |
| 24 | 0 | 0 | 0 | 0 |
| 25 | 4 | 0 | 0 | 0 |
| 26 | 4 | 0 | 0 | 0 |
| 27 | 10 | 10 | 10 | 10 |
| 28 | 10 | 10 | 6 | 6 |
| 29 | 10 | 10 | 10 | 10 |

Also for this composition of latex primed PET the silane coupling agents worked very well as adhesion promoters.

ANTISTAT TEST

As far as tne antistatic behavior is concerned, it is standard practice in the art to measure the value of the conductivity or the resistivity of the surface of a film conditioned at a given temperature and relative humidity.

Our test was carried out on film incubated 24 hours at 22° C. and 50% R.H. employing a "solid state Electrometer" sold manufactured by Keithlem.

TABLE VII

| ANTISTAT TEST | |
|---|---|
| Substrate | Surface Resistivity (ohms/sq) |
| PLAIN PET | $9 \cdot 10^{15}$ |
| GELATIN SUBBING | $2 \cdot 10^{15}$ |
| 19 | $8 \cdot 10^{10}$ |
| 20 | $9 \cdot 10^{10}$ |
| 22 | $8 \cdot 10^{10}$ |
| 24 | $5 \cdot 10^{10}$ |
| 27 | $2 \cdot 10^{10}$ |
| 28 | $4 \cdot 10^{10}$ |

The values of resistivity measurements on substrates 19–28 were low enough to avoid the problems connected with charge accumulated on the film.

RECYCLABILITY TEST

We have done the recyclability test using ground flakes of primed only base and melting them in a disk stamp. Our experiment has conclusively shown that the disk made of flakes containing current PVDC primed PET underwent severe discoloration whereas the disks made of flakes having the acrylate primer of present invention resulted in totally clear and transparent flakes as did the reference disk made of virgin PET.

I claim:

1. A support layer for use with photosensitive media comprising (a) polyester film, (b) on at least one surface of said polyester film, a primer layer comprising a crosslinked blend of at least two polymers, one of said polymers containing a reactive epoxy group and the other of said polymers containing a free hydrogen containing group or salified free hydrogen containing group, and (c) on said primer layer a subbing layer comprising a carrying medium and an ambifunctional silane coupling agent having the formula:

$$(Q)_n—R—Si(OR^1)_3$$

wherein $R^1$ is alkyl or aryl, R is an organic group with (n+1) external bonds, n is 0, 1, or 2 and Q is a moiety reactive with photographic hardeners or gelatin.

2. The support layer of claim 1 wherein said carrying medium comprises either colloidal silica or a mixture of gelatin and sulfonated polymer.

3. The support layer of claim 1 wherein said carrying medium comprises a continuous, porous network of gelled inorganic metal oxide particles.

4. The support layer of claim 1 wherein said carrying medium comprises a mixture of gelatin and sulfonated polymer.

5. The support layer of claim 1 wherein said polyester film comprises polyethyleneterephthalate film.

6. The support layer of claim 4 wherein said polyester film comprises polyethyleneterephthalate film.

7. The support layer of claim 1 wherein said polymer containing a reactive epoxy group comprises from 5 to 50% by weight of units derived from monomers which contain reactive epoxy groups and said free hydrogen group containing polymer comprises from 0.5% to 20% by weight of units derived from monomers containing free hydrogen containing groups.

8. The support layer of claim 3 wherein said polymer containing a reactive epoxy group comprises from 5 to 50% by weight of units derived from monomers which contain reactive epoxy groups and said free hydrogen group containing polymer comprises from 0.5% to 20% by weight of units derived from monomers containing free hydrogen containing groups.

9. The support layer of claim 5 wherein said polymer containing a reactive epoxy group comprises from 10 to 40 percent by weight of units derived from monomers which contain reactive epoxy groups and said free hydrogen group containing polymer comprises from 1 to 10% by weight of units derived from monomers containing free hydrogen containing groups.

10. The support layer of claim 1 wherein said free hydrogen containing groups are selected from the group consisting of hydroxyl groups, carboxylic acid groups, and primary and secondary amines.

11. The support layer of claim 2 wherein said free hydrogen containing groups are selected from the group consisting of hydroxyl groups, carboxylic acid groups, and primary and secondary amines.

12. The support layer of claim 3 wherein said free hydrogen containing groups are selected from the group consisting of hydroxyl groups, carboxylic acid groups, and primary and secondary amines.

13. The support layer of claim 9 wherein said free hydrogen containing groups are selected from the group consisting of hydroxyl groups, carboxylic acid groups, and primary and secondary amines.

14. The support layer of claim 1 wherein $R^1$ is an alkyl of 1 to 10 carbon atoms and R is an aliphatic or aromatic bridging group.

15. The support layer of claim 14 wherein Q comprises an epoxy, primary amino, or secondary amino group.

16. The support layer of claim 15 wherein R is selected from alkylene, arylene, alkarylene, and aralkylene of 1 to 12 carbon atoms which may contain ether or nitrogen linkages.

17. The support layer of claim 2 wherein $R^1$ is an alkyl of 1 to 10 carbon atoms, Q comprises an epoxy, primary amino, or secondary amino group, and R is selected from the group consisting of alkylene, arylene, alkarylene, and arylalkylene of 1 to 12 carbon atoms which may contain ether or nitrogen linkages.

18. The support layer of claim 3 wherein $R^1$ is an alkyl of 1 to 10 carbon atoms, Q comprises an epoxy, primary amino, or secondary amino group, and R is selected from the group consisting of alkylene, arylene, alkarylene, and arylalkylene of 1 to 12 carbon atoms which may contain ether or nitrogen linkages.

19. The support layer of claim 4 wherein $R^1$ is an alkyl of 1 to 10 carbon atoms, Q comprises an epoxy, primary amino, or secondary amino group, and R is selected from the group consisting of alkylene, arylene, alkarylene, and arylalkylene of 1 to 12 carbon atoms which may contain ether or nitrogen linkages.

20. The support layer of claim 5 wherein $R^1$ is an alkyl of 1 to 10 carbon atoms, Q comprises an epoxy, primary amino, or secondary amino group, and R is selected from the group consisting of alkylene, arylene, alkarylene, and arylalkylene of 1 to 12 carbon atoms which may contain ether or nitrogen linkages.

21. The support layer of claim 7 wherein $R^1$ is an alkyl of 1 to 10 carbon atoms, Q comprises an epoxy, primary amino, or secondary amino group, and R is selected from the group consisting of alkylene, arylene, alkarylene, and arylalkylene of 1 to 12 carbon atoms which may contain ether or nitrogen linkages.

* * * * *